United States Patent

[11] 3,584,739

[72] Inventors Edward C. Erichson
5875 Romany Road, Oakland, Calif. 94618;
John F. Finnegan, Box 1145, Tahoe City, Calif. 95730
[21] Appl. No. 884,155
[22] Filed Dec. 11, 1969
[45] Patented June 15, 1971

[54] CONCEALED GOLF COURSE AND SAND TRAP RAKE AND CONTAINER THEREFOR
2 Claims, 5 Drawing Figs.

[52] U.S. Cl. .................................................. 206/16 R,
56/400.04, 206/15.1R, 273/32R, 273/32B, 312/206
[51] Int. Cl. .................................................. B65d 85/54
[50] Field of Search ........................................... 15/258,
265; 56/400.01, 400.04, 400.07; 206/15.1 R, 15.1 B, 16 R; 211/65; 248/110; 273/32 R, 32 B, 32 G; 312/206

[56] References Cited
UNITED STATES PATENTS

| | | | |
|---|---|---|---|
| 1,538,309 | 5/1925 | Thackeray et al. | 15/265 |
| 2,564,472 | 8/1951 | Farnham | 312/206 X |
| 3,124,399 | 3/1964 | Seta | 312/206 |
| 3,210,111 | 10/1965 | Fallon | 56/400.04 X |

Primary Examiner—George E. Lowrance
Assistant Examiner—Steven E. Lipman
Attorney—Mellin, Moore & Weissenberger ABSTRACT: A rake for use in a golf course sand trap in which the rake has a head portion on the same plane as the handle which extends at an angle therefrom, the rake being stored, when not in use, in a container of minimum dimensions to hold the rake. The container is buried in the ground adjacent a sand trap, and is provided with a hinged cover having an artificial turf surface flush with the ground. Downward pressure on the cover unlatches the cover and an internal spring opens the cover and raises the rake handle from the container.

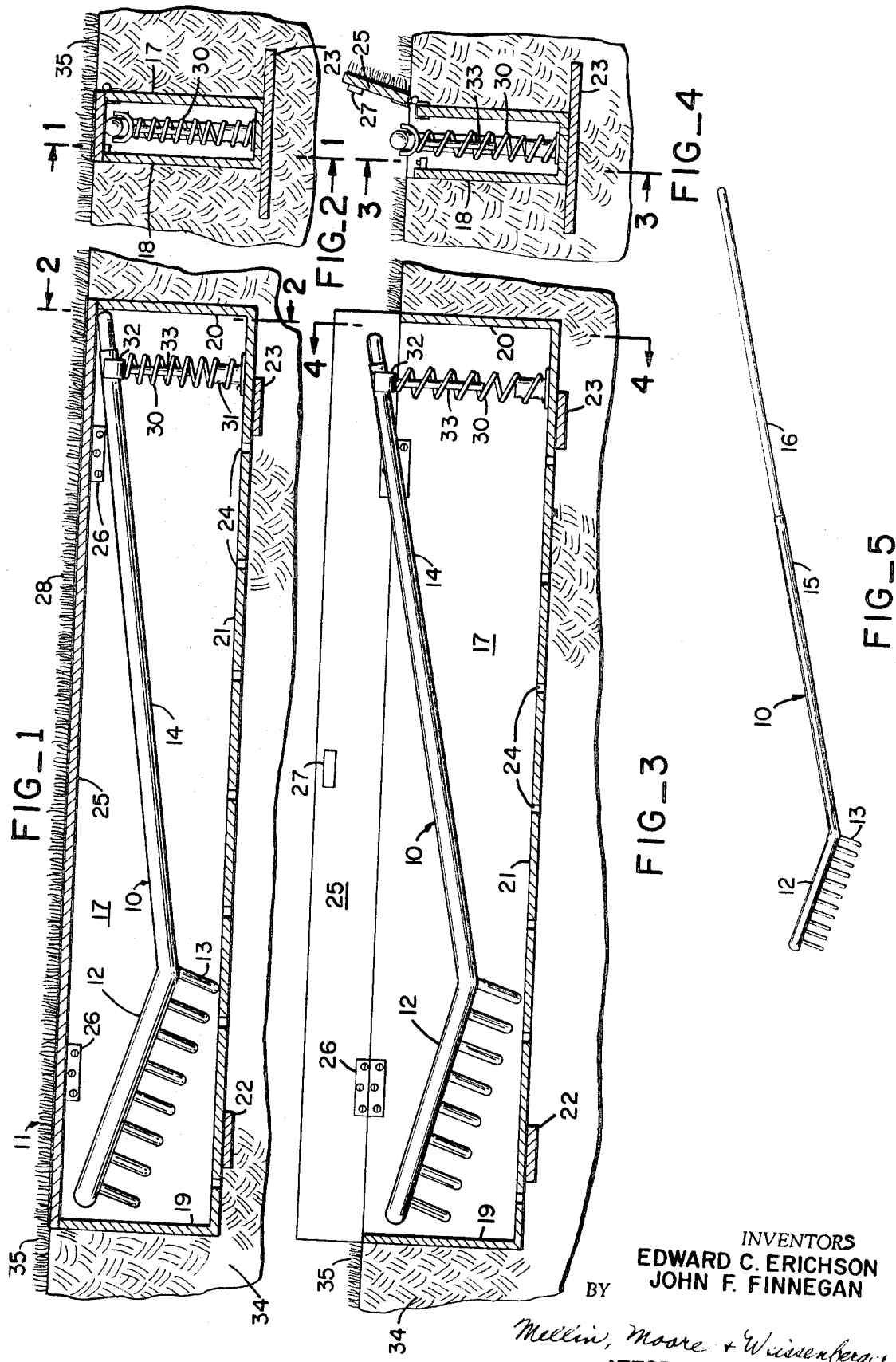
PATENTED JUN 15 1971
3,584,739
INVENTORS
EDWARD C. ERICHSON
JOHN F. FINNEGAN
BY Mellin, Moore + Wissenberger
ATTORNEYS

CONCEALED GOLF COURSE AND SAND TRAP RAKE AND CONTAINER THEREFOR

BACKGROUND OF THE INVENTION

Golf courses are conventionally provided with sand traps located around the greens as hazards. In playing a ball from such a trap the golfer, of course, leaves footprints in the sand which, under the rules of the game, must be obliterated before the golfer leaves the hole. For this purpose, one or more ordinary garden rakes are provided at each trap.

Although such rakes are quite satisfactory for smoothing the sand, they have many undesirable attributes when they are not actually being used. At such times, the rakes are simply left on the ground alongside of the trap, which is not particularly pleasing to aesthetic sensibilities. In addition, the rakes, and particularly the handles thereof, present an undesirable hazard to play in that oftentimes the normal roll of a golf ball will be interrupted by the rake. Course maintenance is impeded by having to move the rake when the course is mowed. A golfer walking near the trap and intent upon the lie of his ball may encounter a personal hazard if a rake is lying on the ground with its tines pointing upwardly.

To overcome these problems, it would be desirable to remove the rakes from view and interference with play when the rakes are not in actual use. However, to do so merely creates other problems. Conventional rakes, with their long handles and right-angle heads, are difficult to store in a concealed manner. There would not be much point in concealing a rake if the place of concealment substitutes interferences with play or course maintenance for those which are sought to be eliminated. In concealing the rake, the place of concealment should be obvious enough for the golfer to find, and yet blend in with the course appearance.

Another problem in providing a way of concealing a rake is that it must be easy and convenient for a golfer to use. If not, it simply will not be used and nothing will have been gained.

It is the principal object of the invention to provide a solution to the above-mentioned problems.

SUMMARY OF THE INVENTION

An initial solution to the problem lies in the design of the present rake. Instead of having the rake head at right angles to the handle, the head lies in the same plane as the handle, which greatly facilitates the ease of storage of the rake. In use, the present rake will be moved from side to side, as a brush, rather than back and forth as a garden rake, but the efficiency of the two, for removing footprints, will be substantially the same.

In order to conceal the rake, a container is sunk into the ground with its cover generally at ground level. The narrow width of the rake reduces the necessary width of the container to a minimum, presenting a more pleasing appearance and reducing both the cost of the container and the labor of installing the container in the ground.

An artificial turf covering is provided for the cover, so that the container will blend in harmoniously with the course and yet provide a sufficient visual contrast with the surrounding natural grass so that it can be readily found. The artificial turf covering will not impede the roll of a golf ball, and, in the event a ball comes to rest on the cover, it can be played therefrom as well as from the surrounding course.

The container is very convenient to use. To open it, the golfer merely presses down on the cover with his foot. An internal spring opens the cover and pushes the handle of the rake up from the container. After use, the golfer merely drops the rake into the container and closes the cover with his foot.

Other objects and advantages will become apparent in the course of the following detailed description.

BRIEF DESCRIPTION OF THE DRAWINGS

In the drawings, forming a part of this application, and in which like parts are designated by like reference numerals, FIG. 1 is a sectional view, in elevation, taken on line 1-1 of FIG. 2, of the container sunk in place in the ground with the rake stored therein;

FIG. 2 is a sectional view, taken on line 2-2 of FIG. 1;

FIGS. 3 and 4 are sectional views, as in FIGS. 1 and 2, showing the container with its cover open;

FIG. 5 illustrates, on a smaller scale, the rake with its handle in extended position.

DESCRIPTION OF THE PREFERRED EMBODIMENT

Referring now to the drawings, wherein is illustrated a preferred embodiment of the invention, reference numerals 10 and 11 identify the rake and container therefor, respectively.

Rake 10 comprises an elongated head portion 12 having a plurality of teeth, or tines, 13 projecting downwardly therefrom. Handle 14 extends upwardly from one end of head 12 and at an angle thereto. Handle 14 is comprised of two telescoping sections 15 and 16 so that the handle may be extended from the stored length of FIG. 1 to its full length as illustrated in FIG. 5. The handle may be held in its extended position in any known manner used in telescopic connections. Since the head 12, teeth 13 and handle 14 all lie in a common plane, the rake has a minimal overall width.

Although the dimensions may be varied, it has been found that a rake having a 12-inch-long head with 2-inch-long teeth and a handle extendable from 30 to 60 inches provides an efficient device for sand trap use. The angle between the head and handle should be such that the head is horizontal to the ground when the extended handle is held by a person of average height. The rake may be made of metal, plastic or wood, or combinations thereof, as desired.

The container 11 is generally rectangular in cross section and is formed with sidewalls 17 and 18, end walls 19 and 20 and bottom 21, and is dimensioned so as to have a minimal length, height and width sufficient to receive the rake 10 therein. The container may be made from metal, plastic or wood, as desired, as long as the material chosen will not deteriorate from ground contact. Ground anchors 22 and 23 are secured to the container and extend outwardly therefrom to hold the container in the ground after embedment. Drain holes 24 are provided in the bottom 21.

Cover 25 is hingedly mounted on container 11, as by hinges 26, and the container and cover are provided with a conventional pressure release catch 27. Such catches operate to latch a door in closed position when the door is closed, and to unlatch when the closing pressure is released and then reapplied.

A layer of artificial turf 28, of sufficient quality as to withstand golf shots therefrom, is secured to the upper surface of cover 25. Such turf, though closely resembling natural grass, has a sufficiently different texture and color shading so that it will be readily noticed by a golfer looking for the rake.

A compression spring 30 is disposed in he container at one end thereof and is held in upright position, as by closely fitting over stub 31 fixed to the container bottom 30. A yoke member 32 is carried at the upper end of spring 30, the yoke having a stem 33 fitting down into the spring. Spring 30 is shown in FIG. 4 in its unstressed position, wherein the spring elevates the yoke 32 above the open top of container 11. When the cover is closed, the cover forces yoke 32 downwardly to compress the spring 30, as illustrated in FIG. 1.

The container 11 is embedded in the ground 34 adjacent a sand trap, with the top of the artificial turf 28 substantially level with the natural grass 35. If desired, two or more of the containers and rakes may be positioned around a trap, particularly if the trap is large.

In operation, the golfer presses down with his foot on the cover 25 to unlatch catch 28. Spring 30 opens the cover and elevates the rake handle 14 from the container. The golfer can either bend over to remove the rake, or, since he will usually be carrying a golf club, he can hook the golf club head under the elevated handle and pull the handle upwardly so that no stooping is required. The golfer then extends the telescoped handle and uses the rake to smooth out the sand trap. Afterwards, the golfer pushes the rake handle closed, carries the rake to the container and puts the head of the rake into the end of the container opposite spring 30. The golfer simply releases the handle, and the handle falls into yoke 32, the handle being guided thereinto because of the narrowness of the container. Using his foot, the golfer swings the cover closed and pushes down thereon to latch it closed.

The rake itself has a further advantage over the conventional rake. Although it will normally be stored when not in use, there will be times when it is left out on the ground. As mentioned above, conventional rakes are often left on the ground with their tines pointing upwardly, presenting a definite source of injury to the unwary. However, because of the shape of the present rake, it is virtually impossible for it to lie in any position except with its tines flat on the ground, thus eliminating such danger to golfers.

Having thus described our invention, we claim:

1. A concealable golf course sand trap rake and container therefor comprising:
   a. a rake having an elongated tined head and an elongated handle upwardly inclined therefrom, said head and handle being in a common plane,
   b. an open-topped container for said rake, said container having minimal length, width and height dimensions sufficient to receive the rake thereinto,
   c. a cover member hingedly mounted on said container, said cover member having a layer of artificial turf mounted on the upper surface thereof,
   d. pressure release catch means for holding said cover member in closed position,
   e. means disposed in said container at one end thereof for receiving the handle of said rake and including a spring which is stressed to energy-storing position when said cover member is closed and which is operable to move said cover member to open position and to lift said rake handle from said container upon release of said catch means.

2. Apparatus as set forth in claim 1, and wherein the bottom of said container is perforated and a plurality of anchor means are provided on the exterior of said container extending outwardly therefrom.